United States Patent
Iwakiri et al.

(10) Patent No.: US 11,016,203 B2
(45) Date of Patent: May 25, 2021

(54) RADIOGRAPHY APPARATUS AND PROGRAM

(71) Applicant: FUJIFILM Corporation, Tokyo (JP)

(72) Inventors: Naoto Iwakiri, Kanagawa (JP); Haruyasu Nakatsugawa, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/371,729

(22) Filed: Apr. 1, 2019

(65) Prior Publication Data

US 2019/0302280 A1 Oct. 3, 2019

(30) Foreign Application Priority Data

Apr. 2, 2018 (JP) .............................. JP2018-071222

(51) Int. Cl.
*G01T 1/16* (2006.01)
*G01T 1/208* (2006.01)
*G01T 1/20* (2006.01)

(52) U.S. Cl.
CPC ............ *G01T 1/208* (2013.01); *G01T 1/2018* (2013.01)

(58) Field of Classification Search
CPC ..... G01T 1/2018; G01T 1/2006; G01T 1/246; G01T 1/208
See application file for complete search history.

(56) References Cited

U.S. PATENT DOCUMENTS

| | | | |
|---|---|---|---|
| 2012/0132821 A1 | 5/2012 | Kuwabara | |
| 2012/0201357 A1* | 8/2012 | Watanabe | H04N 5/32 378/114 |
| 2012/0219114 A1 | 8/2012 | Iwakiri et al. | |
| 2014/0016749 A1* | 1/2014 | Oda | A61B 6/5258 378/62 |
| 2016/0029986 A1* | 2/2016 | Nishii | A61B 6/4233 250/394 |
| 2018/0178492 A1* | 6/2018 | Nagao | B32B 27/281 |
| 2018/0275287 A1* | 9/2018 | Itaya | G21K 4/00 |

FOREIGN PATENT DOCUMENTS

| | | |
|---|---|---|
| JP | 2012-110565 A | 6/2012 |
| JP | 2012-173275 A | 9/2012 |
| JP | 2017-108854 A | 6/2017 |

* cited by examiner

*Primary Examiner* — David P Porta
*Assistant Examiner* — Mamadou Faye
(74) *Attorney, Agent, or Firm* — Birch, Stewart, Kolasch & Birch, LLP

(57) ABSTRACT

The radiography apparatus includes: a plurality of imaging pixels that are provided on a resin substrate having flexibility, are used to capture a radiographic image; a detection unit; an accumulation controller that performs control such that the charge generated in each of the imaging pixels is accumulated in the imaging pixel in a case in which an operation mode is an accumulation mode; and a mode change controller that performs control such that the operation mode of the accumulation controller is changed to the accumulation mode in a case in which a rate of change in a level of an electric signal based on the charge generated in the detection unit per hour or an amount of change in the level of the electric signal per hour is greater than a first threshold value and the level of the electric signal is greater than a second threshold value.

9 Claims, 9 Drawing Sheets

RADIOGRAPHY APPARATUS AND PROGRAM

CROSS-REFERENCE TO RELATED APPLICATIONS

This application claims priority under 35 USC 119 from Japanese Patent Application No. 2018-071222 filed Apr. 2, 2018, the disclosure of which is incorporated by reference herein.

BACKGROUND

1. Technical Field

The disclosed technology relates to a radiography apparatus and a program.

2. Related Art

A radiography apparatus comprising a flat panel detector (FPD) needs to perform synchronization control between the FPD and a radiation source such that the FPD starts an accumulation operation of accumulating signal charge at the irradiation time when the radiation source emits radiation. For example, in a case in which an irradiation start signal generated by an irradiation switch connected to the radiation source is received, a control device, such as a console, that controls the radiography apparatus supplies a synchronous signal to the radiography apparatus in order to synchronize the time when the emission of radiation starts with the time when the FPD starts the signal charge accumulation operation. In a case in which the synchronous signal is received, the radiography apparatus changes to the accumulation operation.

In a case in which an imaging system including a radiography apparatus and a radiation source is configured, an interface for synchronous control (for example, a cable or connector standard or the format of a synchronous signal) which is a standard interface provided in the radiography apparatus or a console for the radiography apparatus may not be suitable as a radiation source interface. Therefore, in order to solve the problem, a radiography apparatus has been developed which has a function of determining whether radiation has been emitted, without using a synchronous signal.

For example, JP2012-110565A discloses a radiographic image detection device comprising: a radiographic image detector in which a plurality of pixels that receive radiation emitted from a radiation source and accumulate signal charge are arranged, each pixel being provided with a switching element; a first determination unit that determines whether the emission of the radiation has started on the basis of the result of comparison between an electric signal obtained by converting the charge generated by the pixel and a threshold value; a second determination unit that verifies whether the electric signal is truly caused by the emission of the radiation or vibration on the basis of a change in the electric signal over time after the first determination unit determines that the emission of the radiation has started since the electric signal is equal to or greater than the threshold value and determines whether the determination of the first determination unit is correct; and control means for controlling an operation of the radiographic image detector on the basis of the determination results of the first and second determination units. The second determination unit includes a differentiation circuit and performs the determination on the basis of the result of comparison between a differential value of the electric signal and a threshold value. Specifically, the second determination unit determines that the electric signal is caused by vibration noise in a case in which the differential value of the electric signal reciprocates between the inside and the outside of the range defined by two threshold values.

JP2017-108854A discloses a radiography apparatus including an irradiation detection unit that detects the start of the emission of radiation. In addition, JP2017-108854A discloses a technique in which the irradiation detection unit analyzes the waveform of an input signal to determine whether there is a detection error since the detection error can occur due to impact in the irradiation detection by the irradiation detection unit.

JP2012-173275A discloses a radiography apparatus comprising a scintillator, an X-ray image detection device main body including a light detection unit that is provided on the X-ray incident side of the scintillator, and a support member that is provided on the X-ray incident side of the X-ray image detection device main body and supports a subject. The light detection unit includes a thin film portion that detects fluorescence as an electric signal and a reinforcing member that is provided on a side of the thin film portion opposite to the scintillator.

SUMMARY

In a case in which a function of determining whether radiation has been emitted is added to the radiography apparatus, there is a concern that the radiography apparatus will determine that radiation has been emitted even though radiation has not been emitted due to noise generated by vibration caused by, for example, impact applied to the radiography apparatus.

According to a radiography apparatus comprising a first determination unit that determines whether the emission of radiation has started on the basis of the result of comparison between an electric signal obtained by converting charge generated by pixels formed on a glass substrate and a threshold value, a second determination unit that determines whether the determination of the first determination unit is correct on the basis of whether a differential value of the electric signal reciprocates between the inside and the outside of the range defined by two different threshold values (that is, whether the differentiated waveform of the electric signal oscillates with a predetermined amplitude or more), and control means for controlling the operation of a radiographic image detector on the basis of the determination results of the first and second determination units, the second determination unit verifies whether the electric signal obtained by converting the charge generated by the pixels is truly caused by the emission of radiation or vibration. However, in a case in which the substrate having the pixels formed thereon is a flexible resin substrate having lower rigidity than the glass substrate according to the related art, the natural frequency of the resin substrate is lower than that of the glass substrate. As a result, the frequency of noise generated by vibration is lower than that in a case in which the glass substrate is used. Therefore, it is difficult to verify whether the electric signal is truly caused by the emission of radiation or vibration, using the method for detecting vibration on the basis of whether the differential value of the electric signal reciprocates between the inside and the outside of the range defined by two different threshold values (that is, whether the differentiated waveform of the electric signal oscillates with a predetermined amplitude or more).

An object of the disclosed technology is to provide a radiography apparatus that includes pixels formed on a flexible resin substrate and has resistance to noise generated due to vibration caused by, for example, impact applied to the radiography apparatus in determination of whether radiation has been emitted.

According to a first aspect of the disclosed technology, there is provided a radiography apparatus comprising: a resin substrate having flexibility; a plurality of imaging pixels that are provided on the resin substrate, are used to capture a radiographic image, and generate charge corresponding to an amount of incident radiation; a detection unit that detects radiation and generates charge corresponding to the amount of incident radiation; an accumulation controller that performs control such that the charge generated in each of the imaging pixels is accumulated in the imaging pixel in a case in which an operation mode is an accumulation mode; and a mode change controller that performs control such that the operation mode of the accumulation controller is changed to the accumulation mode in a case in which a rate of change in a level of an electric signal based on the charge generated in the detection unit per hour or an amount of change in the level of the electric signal per hour is greater than a first threshold value and the level of the electric signal is greater than a second threshold value.

According to a second aspect of the disclosed technology, in the radiography apparatus, in a case in which the operation mode is a standby mode, the accumulation controller may perform control such that the charge generated in each of the imaging pixels is removed from the imaging pixel. In this case, the mode change controller may perform control such that the operation mode of the accumulation controller is changed to the standby mode in a case in which the rate of change in the level of the electric signal per hour or the amount of change in the level of the electric signal per hour is less than the first threshold value after the operation mode of the accumulation controller is changed to the accumulation mode.

According to a third aspect of the disclosed technology, in the radiography apparatus, the mode change controller may perform control such that the accumulation controller is maintained in the accumulation mode in a case in which the rate of change in the level of the electric signal per hour or the amount of change in the level of the electric signal per hour is greater than the first threshold value after the operation mode of the accumulation controller is changed to the accumulation mode.

According to a fourth aspect of the disclosed technology, in the radiography apparatus, in a case in which the operation mode is a read mode, the accumulation controller may perform control such that the charge accumulated in each of the imaging pixels is read. The radiography apparatus may further include a generation unit that generates image data on the basis of the charge read from each of the imaging pixels in the read mode.

According to a fifth aspect of the disclosed technology, the radiography apparatus may further comprise: a scintillator that is stacked on the resin substrate; and a support member that is stacked on the resin substrate and supports the resin substrate. In this case, a natural frequency of a structure including the resin substrate, the scintillator, and the support member may be equal to or less than 1 kilohertz.

According to a sixth aspect of the disclosed technology, in the radiography apparatus, the detection unit may be provided on the resin substrate.

According to a seventh aspect of the disclosed technology, in the radiography apparatus, the resin substrate may include a polyimide film.

According to an eighth aspect of the disclosed technology, in the radiography apparatus, the support member may include plastic or rubber.

According to a ninth aspect of the disclosed technology, there is provided a program that causes a computer to function as the mode change controller of the radiography apparatus according to any one of the first to eighth aspects.

According to the first aspect of the disclosed technology, the radiography apparatus including the pixels formed on the flexible resin substrate can have resistance to noise generated due to vibration caused by, for example, impact applied to the radiography apparatus in the determination of whether radiation has been emitted.

According to the second aspect of the disclosed technology, it is possible to reduce the time lag from the start of the emission of radiation to a change to the accumulation mode.

According to the third aspect of the disclosed technology, the operation mode of the accumulation controller is determined to be the accumulation mode.

According to the fourth aspect of the disclosed technology, image data is generated on the basis of the charge read from each of the imaging pixels.

According to the fifth aspect of the disclosed technology, it is possible to further increase resistance to noise generated due to vibration caused by, for example, impact applied to the radiography apparatus.

According to the sixth aspect of the disclosed technology, it is possible to reduce the size, weight, and cost of the radiography apparatus.

According to the seventh aspect of the disclosed technology, the natural frequency of the structure including the resin substrate, the scintillator, and the support member can be lower than that in a case in which the substrate is a glass substrate.

According to the eighth aspect of the disclosed technology, it is possible to reduce the natural frequency of the structure including the resin substrate, the scintillator, and the support member.

According to the ninth aspect of the disclosed technology, the radiography apparatus including the pixels formed on the flexible resin substrate can have resistance to noise generated due to vibration caused by, for example, impact applied to the radiography apparatus in the determination of whether radiation has been emitted.

BRIEF DESCRIPTION OF THE DRAWINGS

Exemplary embodiments of the present invention will be described in detail based on the following figures, wherein.

DETAILED DESCRIPTION

Figure 1:
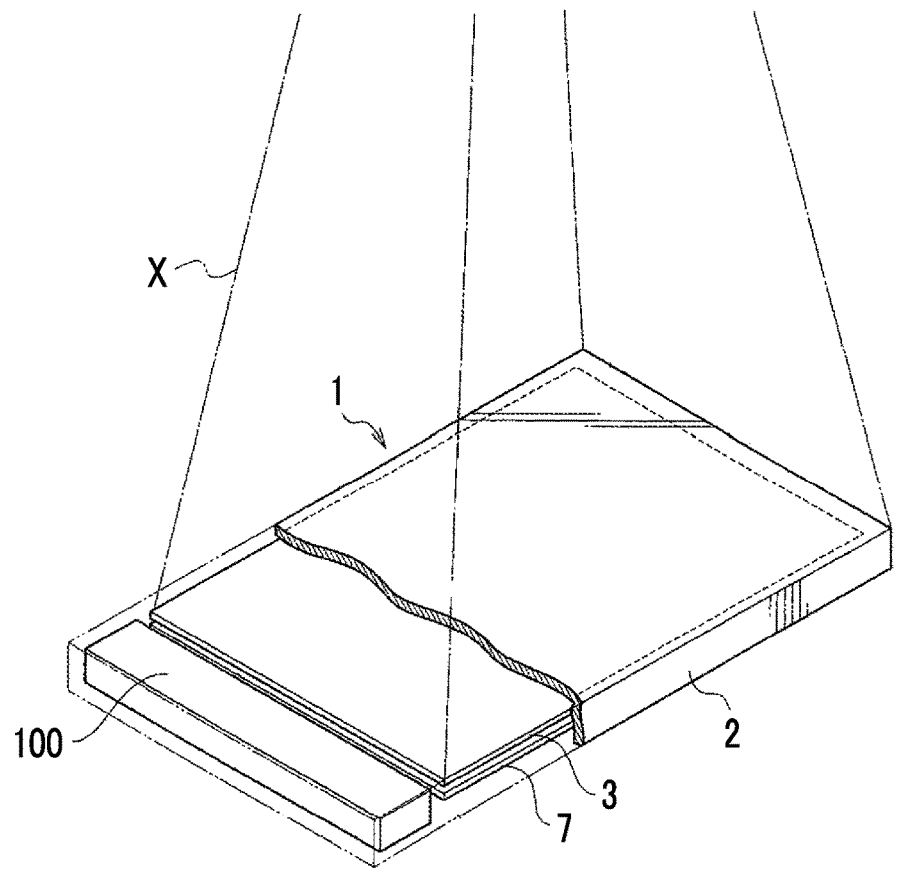
FIG. 1 is a perspective view illustrating an example of the configuration of a radiography apparatus according to an embodiment of the disclosed technology.

Hereinafter, examples of embodiments of the disclosed technology will be described with reference to the drawings. In each of the drawings, the same or equivalent components and portions are denoted by the same reference numerals.

First Embodiment

FIG. 1 is a perspective view illustrating an example of the configuration of a radiography apparatus 1 according to an embodiment of the disclosed technology. The radiography apparatus 1 has the form of a portable electronic cassette. The radiography apparatus 1 includes a radiation detector 3 (flat panel detectors (FPD)), a controller 100, a support plate 7, and a housing 2 that accommodates these components.

The housing 2 has a monocoque structure made of, for example, a carbon fiber reinforced resin (carbon fiber) that has high transmittance of radiation, such as X-rays, light weight, and high durability. An upper surface of the housing 2 is a radiation incident surface on which radiation that has been emitted from a radiation source (not illustrated) and then transmitted through a subject (not illustrated) is incident. In the housing 2, the radiation detector 3 and the support plate 7 are sequentially arranged in this order from the radiation incident surface side.

The support plate 7 supports a circuit substrate 9 (see FIG. 2) on which an integrated circuit chip performing, for example, signal processing is mounted and is fixed to the housing 2. The controller 100 is provided at an end in the housing 2 and includes a battery (not illustrated) and a cassette controller 70 (see FIG. 3).

Figure 2:
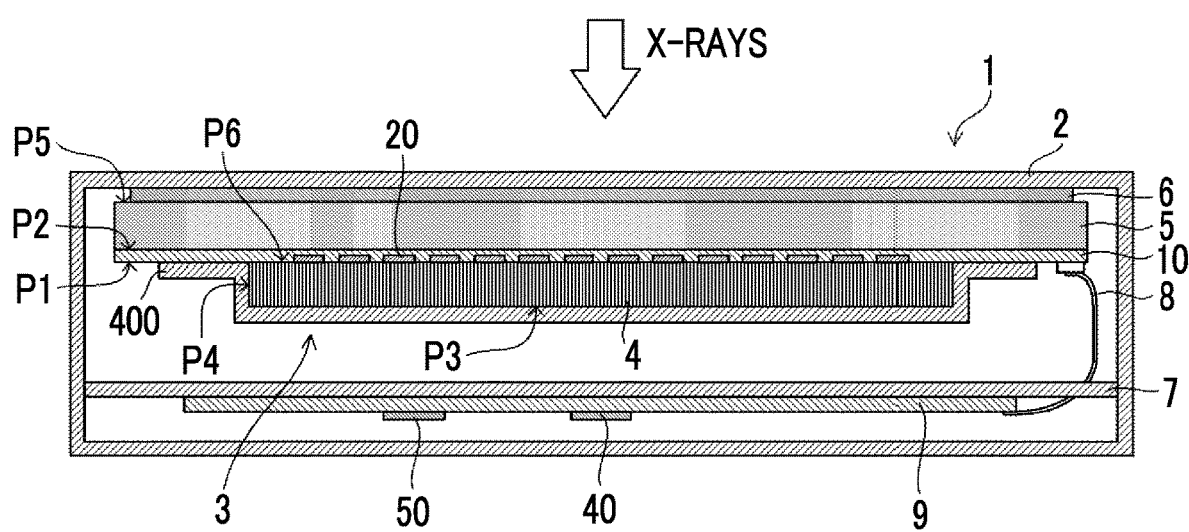
FIG. 2 is a cross-sectional view illustrating an example of the configuration of the radiography apparatus according to the embodiment of the disclosed technology.

FIG. 2 is a cross-sectional view illustrating an example of the configuration of the radiography apparatus 1. The radiation detector 3 includes a flexible thin-film-transistor (TFT) substrate 10, a plurality of pixels 20 which are provided on a surface of the TFT substrate 10 and each of which includes a photoelectric conversion element 21 (see FIG. 3), a scintillator 4 that is stacked on the TFT substrate 10, and a support member 5 that supports the TFT substrate 10.

The TFT substrate 10 is a flexible resin substrate. In the specification, the TFT substrate 10 having flexibility means that, in a case in which one of four sides of the rectangular TFT substrate 10 is fixed, the height of a portion that is 10 cm away from the fixed side of the TFT substrate 10 is less than the height of the fixed side by 2 mm or more due to the weight of the TFT substrate 10. For example, a resin film, such as Xenomax (registered trademark) which is a polyimide film having high heat resistance, can be preferably used as the TFT substrate 10. In a case in which a resin film is used as the material forming the TFT substrate 10, the weight and cost of the radiation detector 3 can be less than those in a case in which a glass substrate is used as the material forming the TFT substrate 10. In addition, it is possible to reduce the risk that the TFT substrate 10 will be damaged by impact. Each of the plurality of pixels 20 is provided on a first surface P1 of the TFT substrate 10.

The scintillator 4 is stacked on the first surface P1 of the TFT substrate 10. The scintillator 4 includes a phosphor for converting incident radiation into light. For example, the scintillator 4 is formed by an aggregate of columnar crystals including, for example, CsI:Tl (cesium iodide to which thallium is added). The columnar crystal of CsI:Tl can be directly formed on the TFT substrate 10 by, for example, a vapor phase growth method. In addition, the columnar crystal of CsI:Tl formed on a substrate different from the TFT substrate 10 may be attached to the TFT substrate 10. Further, $Gd_2O_2S:Tb$ (gadolinium oxysulfide to which terbium is added) may be used as the material forming the scintillator 4. Each of the photoelectric conversion elements 21 (see FIG. 3) forming the plurality of pixels 20 generates charge on the basis of light emitted from the scintillator 4. That is, the photoelectric conversion element 21 generates charge whose amount corresponds to the amount of radiation incident on the radiation detector 3.

In the scintillator 4, a surface P3 which is opposite to a surface P6 facing the TFT substrate 10 and a surface P4 intersecting the surface P3 are covered by a reflecting film 400. The reflecting film 400 has a function of reflecting light emitted from the scintillator 4 to the TFT substrate 10. For example, aluminium oxide ($Al_2O_3$) may be used as the material forming the reflecting film 400. The reflecting film 400 covers the surfaces P3 and P4 of the scintillator 4 and also covers the TFT substrate 10 in a peripheral portion of the scintillator 4. In addition, in a case in which the radiography apparatus 1 can obtain a radiographic image with desired quality even though it is not provided with the reflecting film 400, the reflecting film 400 may be omitted.

In this embodiment, the radiography apparatus 1 adopts an imaging method using irradiation side sampling (ISS) in which the TFT substrate 10 is provided on a radiation incident side. In a case in which the irradiation side sampling is adopted, the distance between the pixel 20 and a strong emission position of the scintillator 4 can be less than that in a case in which penetration side sampling (PSS) in which the scintillator 4 is provided on the radiation incident side is adopted. As a result, it is possible to increase the resolution of a radiographic image. In addition, the radiography apparatus 1 may adopt the penetration side sampling.

The support plate 7 is provided on a side opposite to the radiation incident side of the scintillator 4. A gap is provided between the support plate 7 and the scintillator 4. The support plate 7 is fixed to the side of the housing 2. The circuit substrate 9 is provided on a surface of the support plate 7 which is opposite to the scintillator 4. For example, a signal processing unit 40 that generates image data and an image memory 50 that stores the image data generated by the signal processing unit 40 are mounted on the circuit substrate 9.

The circuit substrate 9 and the TFT substrate 10 are electrically connected to each other through wiring lines that are printed on a flexible printed circuit (FPC) substrate, a tape carrier package (TCP), or a chip-on-film (COF) 8. A gate line driving unit 30 (see FIG. 3) is mounted on another COF (not illustrated in FIG. 2) that electrically connects the circuit substrate 9 and the TFT substrate 10.

The support member 5 is stacked on a second surface P2 of the TFT substrate 10 which is opposite to the first surface P1 and supports the TFT substrate 10. The support member 5 has a function of imparting rigidity required for the TFT substrate 10 to support the scintillator 4 to the TFT substrate 10. That is, in a case in which the support member 5 is provided, the warpage of the TFT substrate 10 by the weight of the scintillator 4 is suppressed as compared to a case in which the support member 5 is not provided. A surface P5 of the support member 5 which is opposite to a contact surface with the TFT substrate 10 is attached to the inner wall of the housing 2 through an adhesive layer 6.

Figure 3:
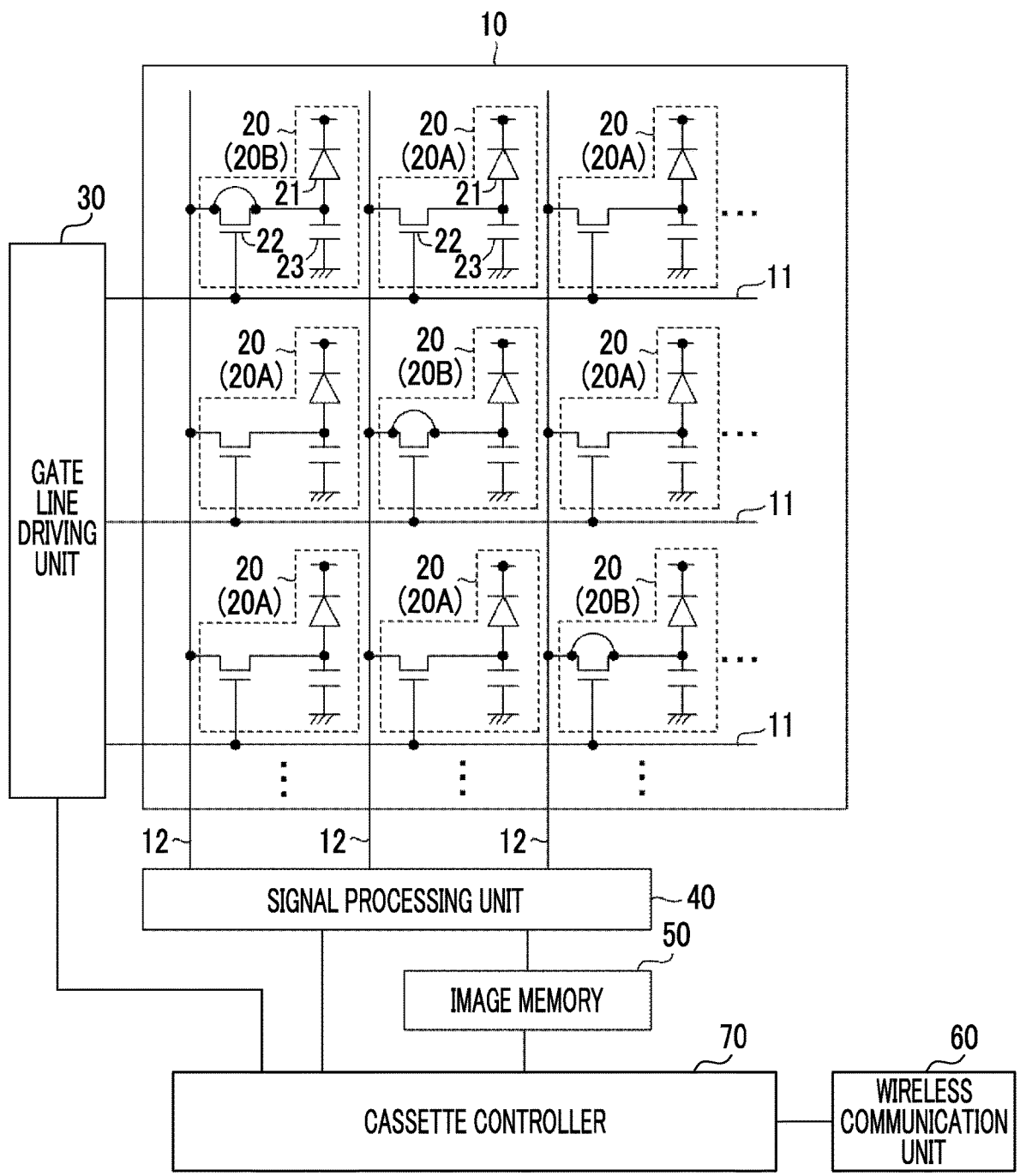
FIG. 3 is a diagram illustrating an example of the electrical configuration of the radiography apparatus according to the embodiment of the disclosed technology.

FIG. 3 is a diagram illustrating an example of the electrical configuration of the radiography apparatus 1. A plurality of pixels 20 are arranged in a matrix on the TFT substrate 10. Each of the plurality of pixels 20 includes the photoelectric conversion element 21, a capacitor 23, and a thin film transistor 22. The photoelectric conversion element 21 may be, for example, a photodiode made of amorphous silicon. Each of the photoelectric conversion elements 21 has a cathode connected to a bias line (not illustrated) to which a bias voltage is applied and an anode which is connected to a source of the corresponding thin film transistor 22. The capacitor 23 has one end which is connected to the source of the corresponding thin film transistor 22 and the other end which is connected to the ground.

The TFT substrate 10 is provided with a plurality of gate lines 11 and a plurality of signal lines 12 that intersect the plurality of gate lines 11. The plurality of gate lines 11 and the plurality of signal lines 12 are arranged along the array of the plurality of pixels 20. Each of the gate lines 11 is connected to the gate line driving unit 30 and gates of the thin film transistors 22. Each of the signal lines 12 is connected to the signal processing unit 40 and drains of the thin film transistors 22.

The gate line driving unit 30 operates in any one of three operation modes, that is, a standby mode, an accumulation mode, and a read mode. The standby mode is an operation mode that is selected in a case in which the radiography apparatus 1 waits for the emission of radiation from the radiation source (not illustrated). In the standby mode, the gate line driving unit 30 controls each of the thin film transistors 22 such that the turn-on and turn-off of each of the thin film transistors 22 are repeated at a predetermined time interval. Then, charge generated in each of the photoelectric conversion elements 21 of imaging pixels 20A, which will be described below, is intermittently removed from the imaging pixel 20A. The influence of a dark current caused by the charge generated in the imaging pixel 20A in a case in which radiation is not emitted is suppressed by this process. In addition, the turn-on and turn-off of the thin film transistor 22 are controlled by a driving signal that is output from the gate line driving unit 30 and is then input to the gate of the thin film transistor 22 through the gate line 11.

The accumulation mode is an operation mode that is selected in a case in which the emission of radiation from the radiation source (not illustrated) is detected in the radiography apparatus 1. In the accumulation mode, the gate line driving unit 30 controls all of the thin film transistors 22 so as to be turned off. Then, the charge generated in the photoelectric conversion element 21 of each of the imaging pixels 20A is accumulated in the corresponding capacitor 23.

The read mode is an operation mode that is selected in a case in which a radiographic image is acquired on the basis of the charge accumulated in each of the imaging pixels 20A. In the read mode, the gate line driving unit 30 controls the thin film transistors 22 such that rows of the thin film transistors 22 are sequentially turned on. Charge read by the thin film transistor 22 in the on state is input as an electric signal to the signal processing unit 40 through each signal line 12.

The signal processing unit 40 includes a charge amplifier, a sample-and-hold circuit, a multiplexer, and an analog/digital (A/D) converter which are not illustrated in the drawings. The charge amplifier generates an electric signal with a voltage level corresponding to the amount of charge read from each pixel 20 through each signal line 12. The level of the electric signal generated by the charge amplifier is held by the sample-and-hold circuit. An output terminal of each sample-and-hold circuit is connected to a common multiplexer. The multiplexer converts the signal level held by the sample-and-hold circuit into serial data and supplies the serial data to the A/D converter. The A/D converter converts an analog electric signal supplied from the multiplexer into a digital signal. The signal processing unit 40 generates image data in which the digital signal output from the A/D converter is associated with the coordinate position of each pixel 20.

The image memory 50 is connected to the signal processing unit 40. The image data generated by the signal processing unit 40 is stored in the image memory 50. The image memory 50 has storage capacity capable of storing a predetermined amount of image data. Whenever a radiographic image is captured, image data obtained by imaging is sequentially stored in the image memory 50.

A wireless communication unit 60 controls the transmission of various kinds of information to an external apparatus by wireless communication. The cassette controller 70 can perform wireless communication with an external apparatus, such as a console (not illustrated) that performs control related to the capture of a radiographic image, through the wireless communication unit 60 and can transmit and receive various kinds of information to and from the external apparatus.

The cassette controller 70 is connected to the gate line driving unit 30, the signal processing unit 40, the image memory 50, and the wireless communication unit 60 so as to communicate therewith and controls the overall operation of the radiography apparatus 1.

The radiography apparatus 1 has a function of determining whether the radiation source (not illustrated) has emitted radiation. In order to implement the function, the plurality of pixels 20 include the imaging pixels 20A and radiation detection pixels 20B. The imaging pixel 20A is a pixel used to capture a radiographic image and the radiation detection pixel 20B is a pixel used to determine whether the radiation source (not illustrated) has emitted radiation. In the radiation detection pixel 20B, the source and the drain of the thin film transistor 22 are short-circuited. Therefore, in the radiation detection pixel 20B, the generated charge flows to the signal line 12 regardless of whether the thin film transistor 22 is turned on or off.

In a case in which it is determined that radiation has been emitted from the radiation source on the basis of an output signal from the radiation detection pixel 20B, the cassette controller 70 supplies a control signal to the gate line driving unit 30 to change the operation mode of the gate line driving unit 30 to the accumulation mode. In the accumulation mode, the gate line driving unit 30 controls all of the thin film transistors 22 so as to be turned off. Then, the charge generated in the photoelectric conversion element 21 of the imaging pixel 20A by the emission of radiation is accumulated in the capacitor 23. That is, pixel information of the radiographic image is recorded in each imaging pixel 20A. As such, the radiography apparatus 1 has the function of determining whether the radiation source (not illustrated) has emitted radiation. Therefore, even in a case in which the radiography apparatus 1 does not have an interface with the radiation source, the radiography apparatus 1 can be changed to a radiographic image capture operation in operative association with the start of the emission of radiation from the radiation source.

Figure 4:
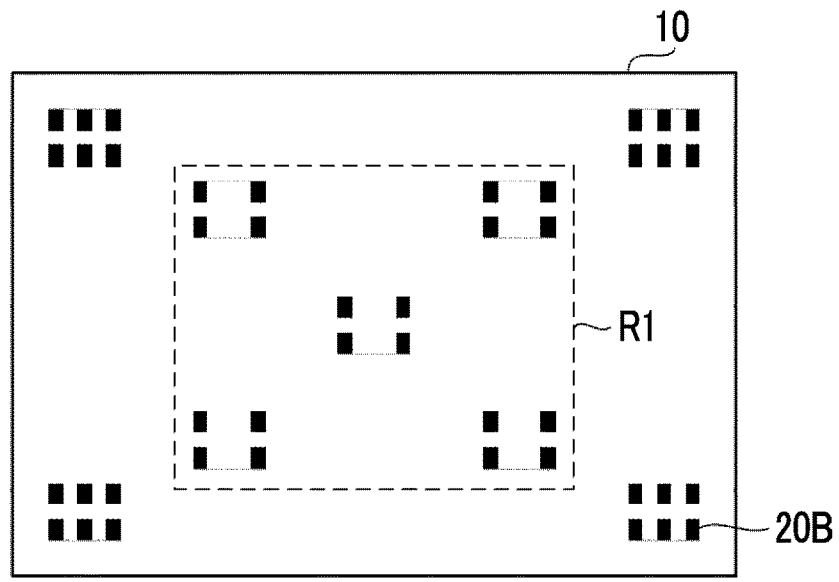
FIG. 4 is a plan view illustrating an example of the arrangement of radiation detection pixels according to the embodiment of the disclosed technology.

In the TFT substrate 10, it is difficult to obtain the pixel information of the radiographic image at the arrangement position of the radiation detection pixel 20B. Therefore, it is preferable that the radiation detection pixels 20B are dispersively arranged in an imaging region in the TFT substrate 10. In addition, for example, as illustrated in FIG. 4, the radiation detection pixels 20B may be arranged at relatively low density in a partial region R1 including a central portion of the TFT substrate 10 and may be arranged at relatively high density in a region around the partial region. Further, in a case in which a radiographic image is generated, the radiography apparatus 1 or the console (not illustrated) may perform a defective pixel correction process that interpolates a pixel value at the arrangement position of the radiation detection pixel 20B with the values of the imaging pixels 20A located around the radiation detection pixel 20B.

The radiography apparatus 1 includes means for suppressing an error in determining whether radiation has been emitted (hereinafter, referred to as radiation emission determination) which is caused by noise (hereinafter, referred to as vibration noise) generated due to vibration caused by, for example, impact applied to the radiography apparatus 1.

Figure 5:
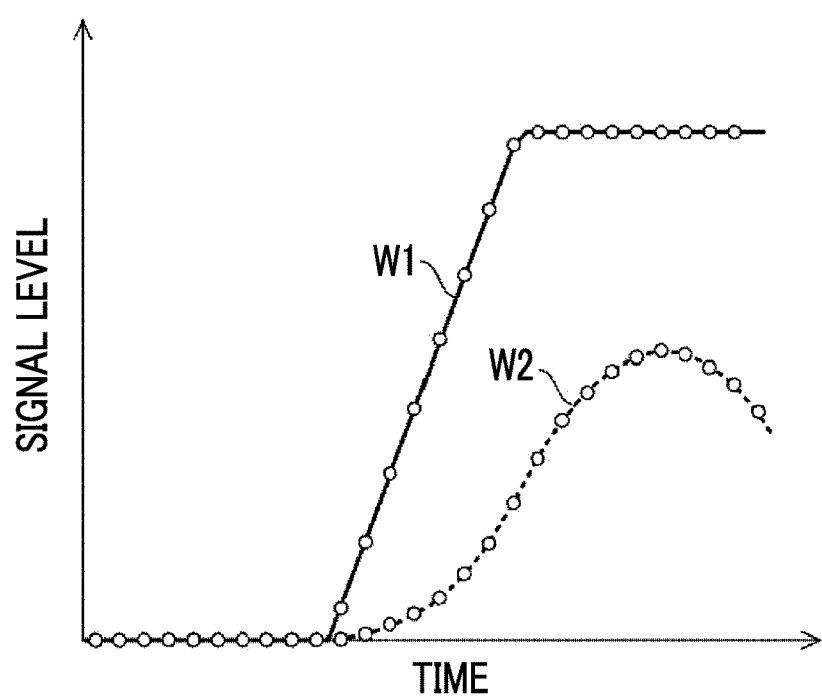
FIG. 5 is a diagram illustrating an example of a radiation waveform and a vibration noise waveform according to the embodiment of the disclosed technology.

The principle of suppressing erroneous determination caused by the vibration noise in the radiation emission determination in the radiography apparatus 1 will be described with reference to FIG. 5. In FIG. 5, a solid line indicates an example of a waveform (hereinafter, referred to as a radiation waveform) W1 of an electric signal flowing to the signal line 12 on the basis of the charge generated in the radiation detection pixel 20B by the emission of radiation from the radiation source (not illustrated). In addition, in FIG. 5, a dotted line indicates an example of a waveform (hereinafter, referred to as a vibration noise waveform) W2 of the vibration noise generated due to vibration caused by, for example, impact applied to the radiography apparatus 1. In FIG. 5, each plot is a sampling value that is output from the A/D converter (not illustrated) provided in the signal processing unit 40.

As illustrated in FIG. 5, the rising slope of the vibration noise waveform W2 is less than the rising slope of the radiation waveform W1. The radiation waveform W1 and the vibration noise waveform W2 are distinguished from each other on the basis of the difference between the rising slope of the radiation waveform W1 and the rising slope of the vibration noise waveform W2 (the rate of change per hour or the amount of change per hour) to suppress an error in the radiation emission determination and to accurately perform the radiation emission determination.

As the difference between the rising slope of the vibration noise waveform W2 and the rising slope of the radiation waveform W1 becomes larger, the accuracy of distinguishing the radiation waveform W1 and the vibration noise waveform W2 can become higher. The rising slope of the vibration noise waveform W2 depends on the natural frequency of a structure including the TFT substrate 10, the scintillator 4, and the support member 5. That is, as the natural frequency of the structure becomes lower, the rising slope of the vibration noise waveform W2 becomes smaller and the difference between the rising slope of the vibration noise waveform W2 and the rising slope of the radiation waveform W1 becomes larger.

From this point of view, it is preferable that the natural frequency of the structure including the TFT substrate 10, the scintillator 4, and the support member 5 is equal to or less than, for example, 1 kilohertz. In a case in which the natural frequency of the structure including the TFT substrate 10, the scintillator 4, and the support member 5 is equal to or less than 1 kilohertz, it is possible to accurately distinguish the vibration noise waveform W2 and the radiation waveform W1 and to accurately perform the radiation emission determination. In addition, a flexible material, such as a resin film, is used as the material forming the TFT substrate 10. Therefore, the natural frequency of the structure can be lower than that in a case in which the TFT substrate 10 is a glass substrate.

In addition, as the Young's modulus of the material used as the support member 5 becomes smaller, the natural frequency of the structure can become lower. It is preferable that the Young's modulus of the material used as the support member 5 is equal to or less than, for example, 50 GPa. Examples of a candidate material for the support member 5 are plastics, such as PET (Young's modulus: 10 GPa to 20 GPa), polycarbonate (Young's modulus: 2 GPa to 3 GPa), polystyrene (Young's modulus: 3 GPa to 3.5 GPa), polyethylene (Young's modulus: 0.4 GPa to 1.3 GPa), and polypropylene (Young's modulus: 1.5 GPa to 2 GPa), and rubber (Young's modulus: 0.01 GPa to 0.1 GPa).

The cassette controller 70 performs a mode change control process, which will be described below, to implement the function of determining whether radiation has been emitted while suppressing erroneous determination caused by vibration noise.

Figure 6:
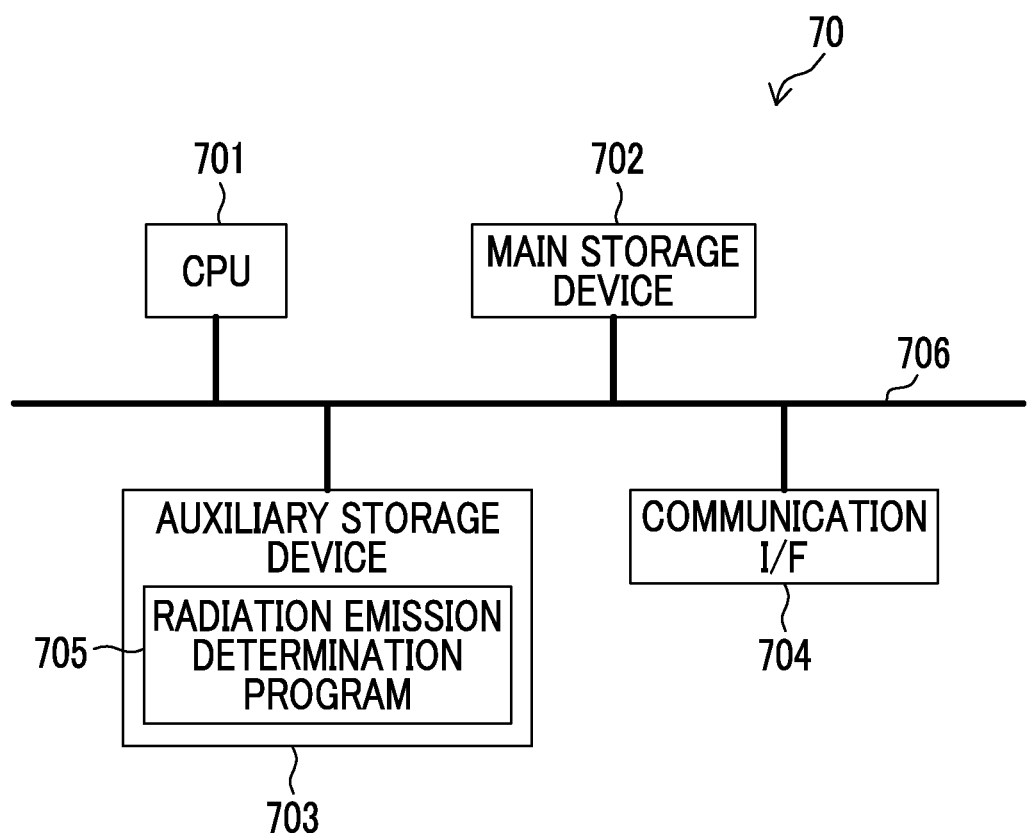
FIG. 6 is a diagram illustrating an example of the hardware configuration of a cassette controller according to the embodiment of the disclosed technology.

Here, FIG. 6 is a diagram illustrating an example of the hardware configuration of the cassette controller 70. The cassette controller 70 is a computer comprising a central processing unit (CPU) 701, a main storage device 702 as a temporary storage region, a non-volatile auxiliary storage device 703, and a communication interface (I/F) 704. The communication I/F 704 is an interface for communication with the gate line driving unit 30, the signal processing unit 40, the image memory 50, and the wireless communication unit 60. The CPU 701, the main storage device 702, the auxiliary storage device 703, and the communication I/F 704 are connected to a bus 706. The auxiliary storage device 703 stores a mode change control program 705 in which the procedure of the mode change control process is described. The CPU 701 executes the mode change control program 705 such that the cassette controller 70 functions as a mode change controller.

Figure 7:
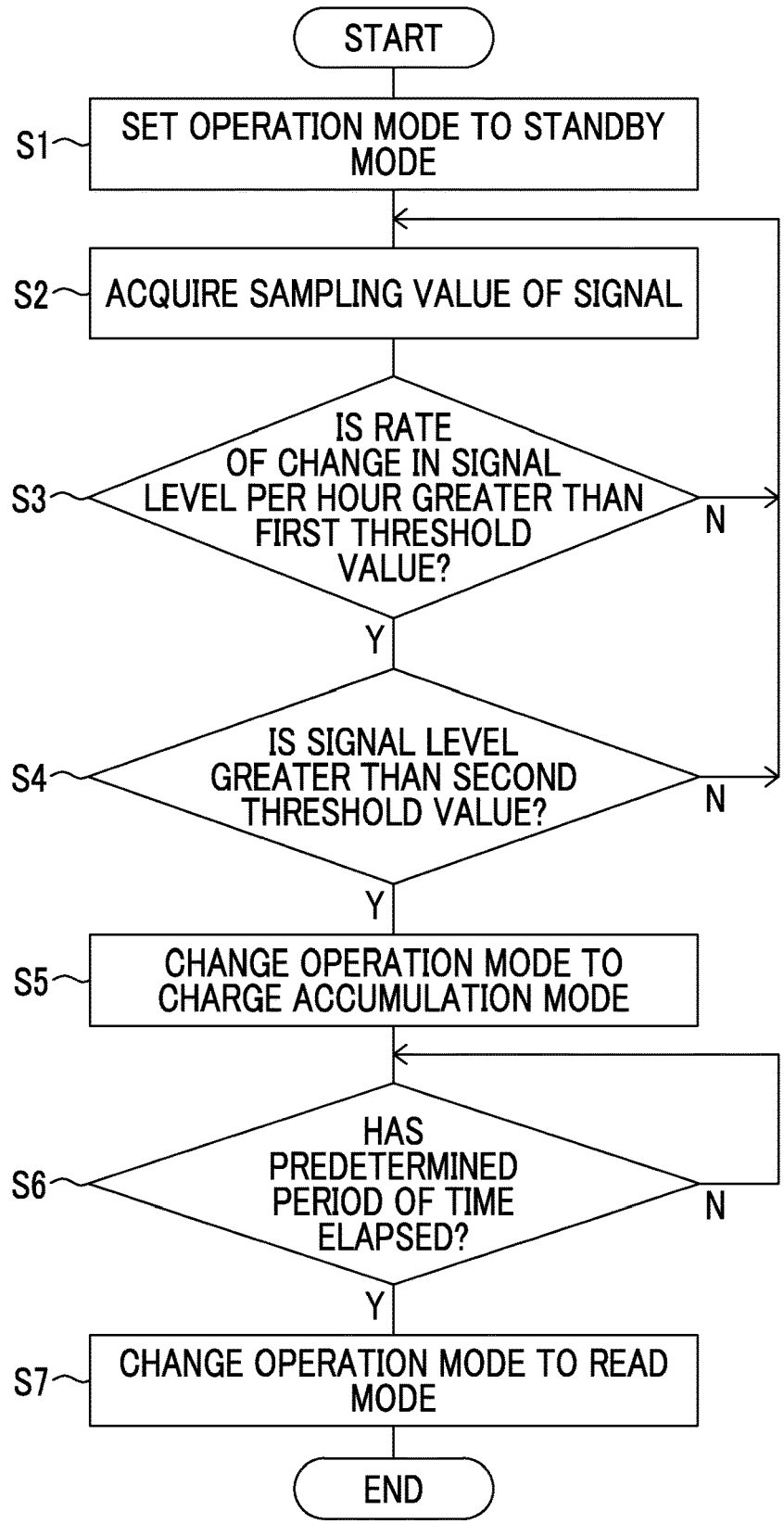
FIG. 7 is a flowchart illustrating an example of the flow of a mode change control process performed in the cassette controller according to the embodiment of the disclosed technology.

FIG. 7 is a flowchart illustrating an example of the flow of the mode change control process performed by the cassette controller 70.

For example, in a case in which an operation of inputting a command to start the capture of a radiographic image to the radiography apparatus 1 is performed, in Step S1, the CPU 701 sets the operation mode of the gate line driving unit 30 to the standby mode.

In Step S2, the CPU 701 acquires a plurality of successive sampling values of the electric signals based on the charge generated in the radiation detection pixels 20B from the signal processing unit 40. That is, the CPU 701 acquires a plurality of sampling values indicating the levels of the electric signal at each point of time within a predetermined period.

In Step S3, the CPU 701 derives the rate of change in the electric signal per hour on the basis of the plurality of sampling values and determines whether the derived rate of change is greater than a first threshold value. The first threshold value is set to a value that can distinguish a case in which the electric signal is caused by the emission of radiation from a case in which the electric signal is caused by vibration noise. That is, in Step S3, it is determined whether the slope of the electric signal is sufficiently greater than the slope of the vibration noise waveform.

In addition, a sampling value sampled at the beginning of the sampling period and a sampling value sampled at the end of the sampling period may be used to derive the rate of change in the electric signal per hour. Further, the average value of a plurality of sampling values sampled in the first half of the sampling period and the average value of a plurality of sampling values sampled in the second half of the sampling period may be used.

For example, in a case in which the sampling value sampled at the beginning of a sampling period T is D1 and the sampling value sampled at the end of the sampling period T is D2, the rate of change A in the electric signal per hour can be represented by the following Expression (1):

$$A=(D1/D2)/T \qquad (1).$$

In a case in which it is determined that the rate of change in the electric signal per hour is not greater than the first threshold value, the CPU 701 determines that no radiation has been emitted and returns the process to Step S2. In a case in which it is determined that the rate of change in the electric signal per hour is greater than the first threshold value, the CPU 701 advances the process to Step S4.

In Step S4, the CPU 701 determines whether the level of the electric signal is greater than a second threshold value on the basis of the plurality of sampling values. The second threshold value is set to an appropriate value considering the trade-off between resistance to the vibration noise and the detection sensitivity of radiation. In addition, in the determination, the maximum value among the plurality of sampling values may be used as the level of the electric signal. Further, in the determination, the last sampling value among the plurality of sampling values may be used as the level of the electric signal. In a case in which it is determined that the level of the electric signal is not greater than the second threshold value, the CPU 701 determines that no radiation has been emitted and returns the process to Step S2. In a case in which it is determined that the level of the electric signal is greater than the second threshold value, the CPU 701 determines that radiation has been emitted and advances the process to Step S5.

In Step S5, the CPU 701 supplies a control signal to the gate line driving unit 30 to change the operation mode of the gate line driving unit 30 to the accumulation mode. Then, the gate line driving unit 30 turns off all of the thin film transistors 22. Then, the charge generated in the photoelectric conversion element 21 of each imaging pixel 20A by the emission of radiation is accumulated in the corresponding capacitor 23.

In Step S6, the CPU 701 determines whether a predetermined period has elapsed since the operation mode of the gate line driving unit 30 has been changed to the accumulation mode. The predetermined period is set to a period of time enough to record the pixel information of the radiographic image in each imaging pixel 20A. In a case in which it is determined that the predetermined period has elapsed since the operation mode of the gate line driving unit 30 has been changed to the accumulation mode, the CPU 701 advances the process to Step S7.

In Step S7, the CPU 701 supplies a control signal to the gate line driving unit 30 to change the operation mode of the gate line driving unit 30 to the read mode. Then, the gate line driving unit 30 performs control such that the rows of the thin film transistors 22 are sequentially turned on. The charge read by the thin film transistors 22 in the on state is input to the signal processing unit 40 through each signal line 12. The signal processing unit 40 generates image data on the basis of the charge read from each imaging pixel 20A. The image data generated by the signal processing unit 40 is stored in the image memory 50. Then, the CPU 701 ends this routine.

In the mode change control process, the process in Step S3 and the process in Step S4 may be interchanged. That is, after the determination for the level of the electric signal based on the charge generated in the radiation detection pixel 20B is performed, the determination for the slope of the electric signal may be performed.

Figure 8:
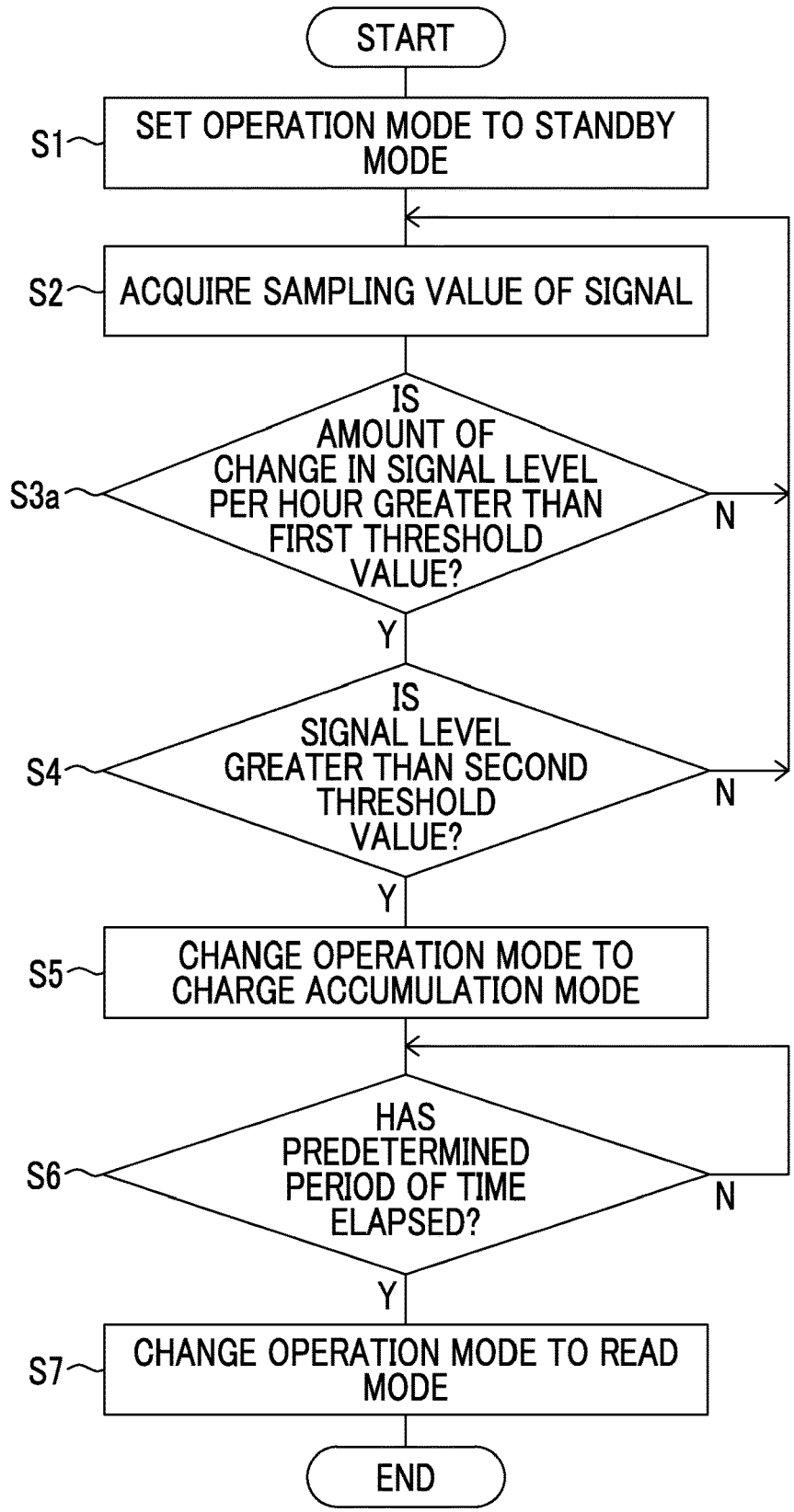
FIG. 8 is a flowchart illustrating an example of the flow of the mode change control process performed in the cassette controller according to the embodiment of the disclosed technology.

FIG. 8 is a flowchart illustrating another example of the flow of the mode change control process performed in the cassette controller 70. In this example, in Step S3*a*, the CPU 701 derives the amount of change in the electric signal per hour on the basis of a plurality of sampling values and determines whether the derived amount of change is greater than a first threshold value.

In addition, a sampling value sampled at the beginning of the sampling period and a sampling value sampled at the end of the sampling period may be used to derive the amount of change in the electric signal per hour. Further, the average value of a plurality of sampling values sampled in the first half of the sampling period and the average value of a plurality of sampling values sampled in the second half of the sampling period may be used.

For example, in a case in which the sampling value sampled at the beginning of the sampling period T is D1 and the sampling value sampled at the end of the sampling period T is D2, the amount of change B in the electric signal per hour can be represented by the following Expression (2):

$$B=(D1-D2)/T \qquad (2).$$

As described above, according to the radiography apparatus 1 according to the first embodiment of the disclosed technology, radiation emission determination is performed on the basis of the slope of the electric signal in addition to the level of the electric signal based on the charge generated in the radiation detection pixel 20B. In this case, resistance to vibration noise in the radiation emission determination can be higher than that in a case in which the radiation emission determination is performed on the basis of only the level of the electric signal. In addition, it is not necessary to detect the vibration of a differential value of the electric signal in the radiation emission determination. Therefore, it is possible to appropriately perform the radiation emission determination even though the frequency of vibration noise in a case in which the TFT substrate 10 is a resin substrate is lower than that in a case in which the TFT substrate 10 is a glass substrate.

Second Embodiment

Figure 9:
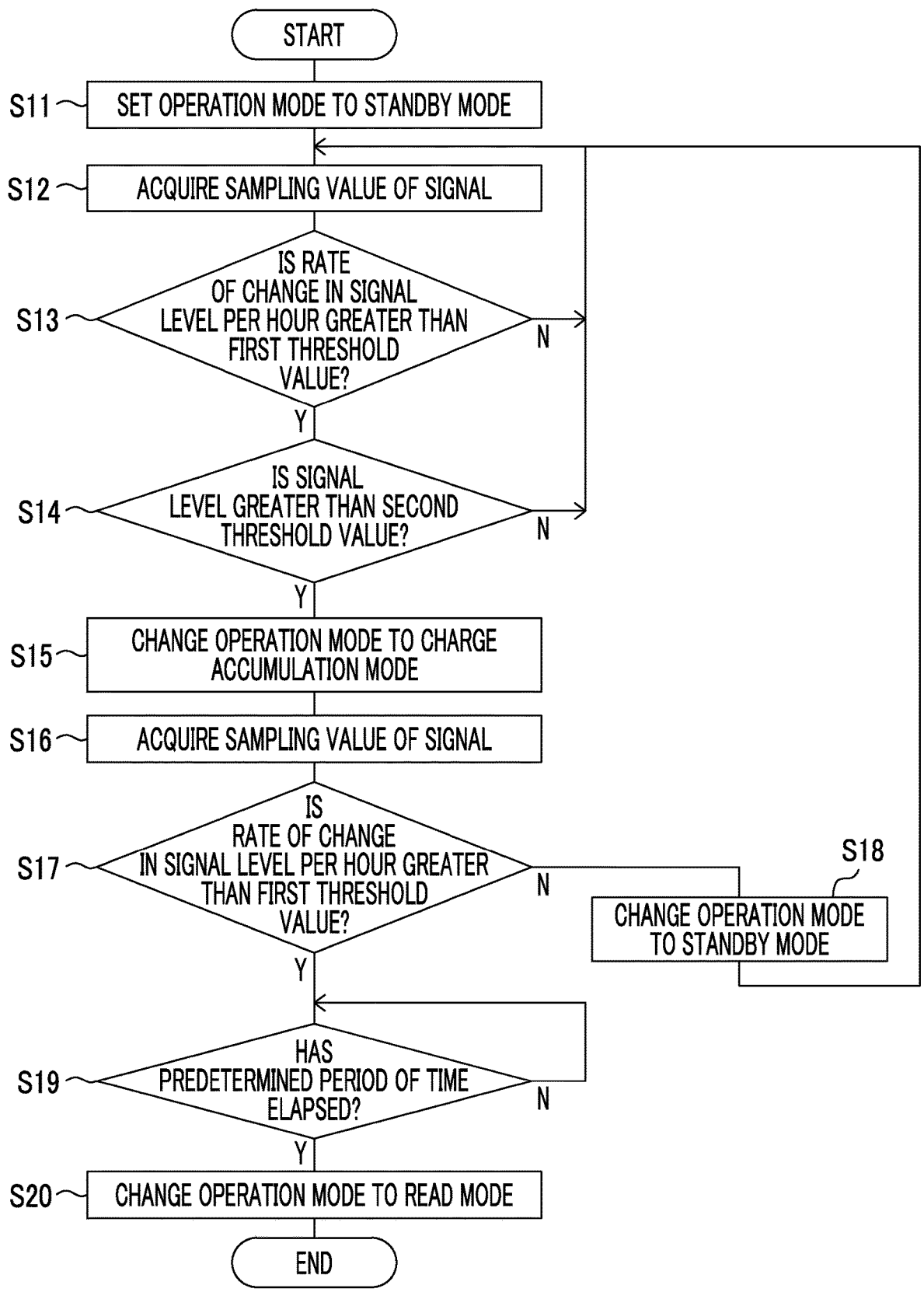
FIG. 9 is a flowchart illustrating an example of the flow of a mode change control process performed in a cassette controller according to an embodiment of the disclosed technology.

FIG. 9 is a flowchart illustrating an example of the flow of a mode change control process performed in the cassette controller 70 according to a second embodiment of the disclosed technology.

For example, in a case in which an operation of inputting a command to start the capture of a radiographic image to the radiography apparatus 1 is performed, in Step S11, the CPU 701 sets the operation mode of the gate line driving unit 30 to the standby mode.

In Step S12, the CPU 701 acquires a plurality of successive sampling values of the electric signals based on the charge generated in the radiation detection pixels 20B from the signal processing unit 40. That is, the CPU 701 acquires a plurality of sampling values indicating the levels of the electric signal at each point of time within a predetermined period.

In Step S13, the CPU 701 derives the rate of change in the electric signal per hour on the basis of the plurality of sampling values and determines whether the derived rate of change is greater than a first threshold value. The first threshold value is set to a value that can distinguish a case in which the electric signal is caused by the emission of radiation from a case in which the electric signal is caused by vibration noise. That is, in Step S13, it is determined whether the slope of the electric signal is sufficiently greater than the slope of the vibration noise waveform.

In a case in which it is determined that the rate of change in the electric signal per hour is not greater than the first threshold value, the CPU 701 determines that no radiation has been emitted and returns the process to Step S12. In a case in which it is determined that the rate of change in the electric signal per hour is greater than the first threshold value, the CPU 701 advances the process to Step S14.

In Step S14, the CPU 701 determines whether the level of the electric signal is greater than a second threshold value on the basis of the plurality of sampling values. The second threshold value is set to an appropriate value considering the trade-off between resistance to all noise including the vibration noise and the detection sensitivity of radiation. In a case in which it is determined that the level of the electric signal is not greater than the second threshold value, the CPU 701 determines that no radiation has been emitted and returns the process to Step S12. In a case in which it is determined that the level of the electric signal is greater than the second threshold value, the CPU 701 determines that radiation has been emitted and advances the process to Step S15.

In Step S15, the CPU 701 supplies a control signal to the gate line driving unit 30 to temporarily change the operation mode of the gate line driving unit 30 to the accumulation mode. Then, the gate line driving unit 30 turns off all of the thin film transistors 22. Then, charge generated in the photoelectric conversion element 21 of each imaging pixel 20A by the emission of radiation is accumulated in the corresponding capacitor 23.

In Step S16, the CPU 701 acquires a plurality of successive sampling values of the electric signals based on the charge generated in the radiation detection pixels 20B from the signal processing unit 40. That is, the CPU 701 acquires a plurality of sampling values at each point of time after the time when the plurality of sampling values are acquired in Step S12.

In Step S17, the CPU 701 derives the rate of change in the electric signal per hour on the basis of the latest sampling value acquired in Step S16 and determines whether the derived rate of change is greater than the first threshold value.

In a case in which it is determined that the rate of change in the electric signal per hour is not greater than the first threshold value, the CPU 701 determines that there is an error in the previous determination that radiation has been emitted and advances the process to Step S18. On the other hand, in a case in which it is determined that the rate of change in the electric signal per hour is greater than the first threshold value, the CPU 701 determines that there is no error in the previous determination that radiation has been emitted, maintains the accumulation mode of the gate line driving unit 30, and advances the process to Step S19.

In Step S18, the CPU 701 supplies a control signal to the gate line driving unit 30 to change the operation mode of the gate line driving unit 30 to the standby mode. Then, the gate line driving unit 30 controls each of the thin film transistors 22 such that the turn-on and turn-off of each of the thin film transistors 22 are repeated at a predetermined time interval. Then, the process returns to Step S12.

In Step S19, the CPU 701 determines whether a predetermined period has elapsed since the operation mode of the gate line driving unit 30 has been changed to the accumulation mode. The predetermined period is set to a period of time enough to record the pixel information of the radiographic image in each imaging pixel 20A. In a case in which it is determined that a predetermined period has elapsed since the operation mode of the gate line driving unit 30 has been changed to the accumulation mode, the CPU 701 advances the process to Step S20.

In Step S20, the CPU 701 supplies a control signal to the gate line driving unit 30 to change the operation mode of the gate line driving unit 30 to the read mode. Then, the gate line driving unit 30 performs control such that the rows of the thin film transistors 22 are sequentially turned on. The charge read by the thin film transistors 22 in the on state is input to the signal processing unit 40 through each signal line 12. The signal processing unit 40 generates image data on the basis of the charge read from each imaging pixel 20A. The image data generated by the signal processing unit 40 is stored in the image memory 50. Then, the CPU 701 ends this routine.

In the mode change control process, the process in Step S13 and the process in Step S14 may be interchanged. That is, after the determination for the level of the electric signal based on the charge generated in the radiation detection pixel 20B is performed, the determination for the rate of change in the electric signal per hour may be performed.

Figure 10:
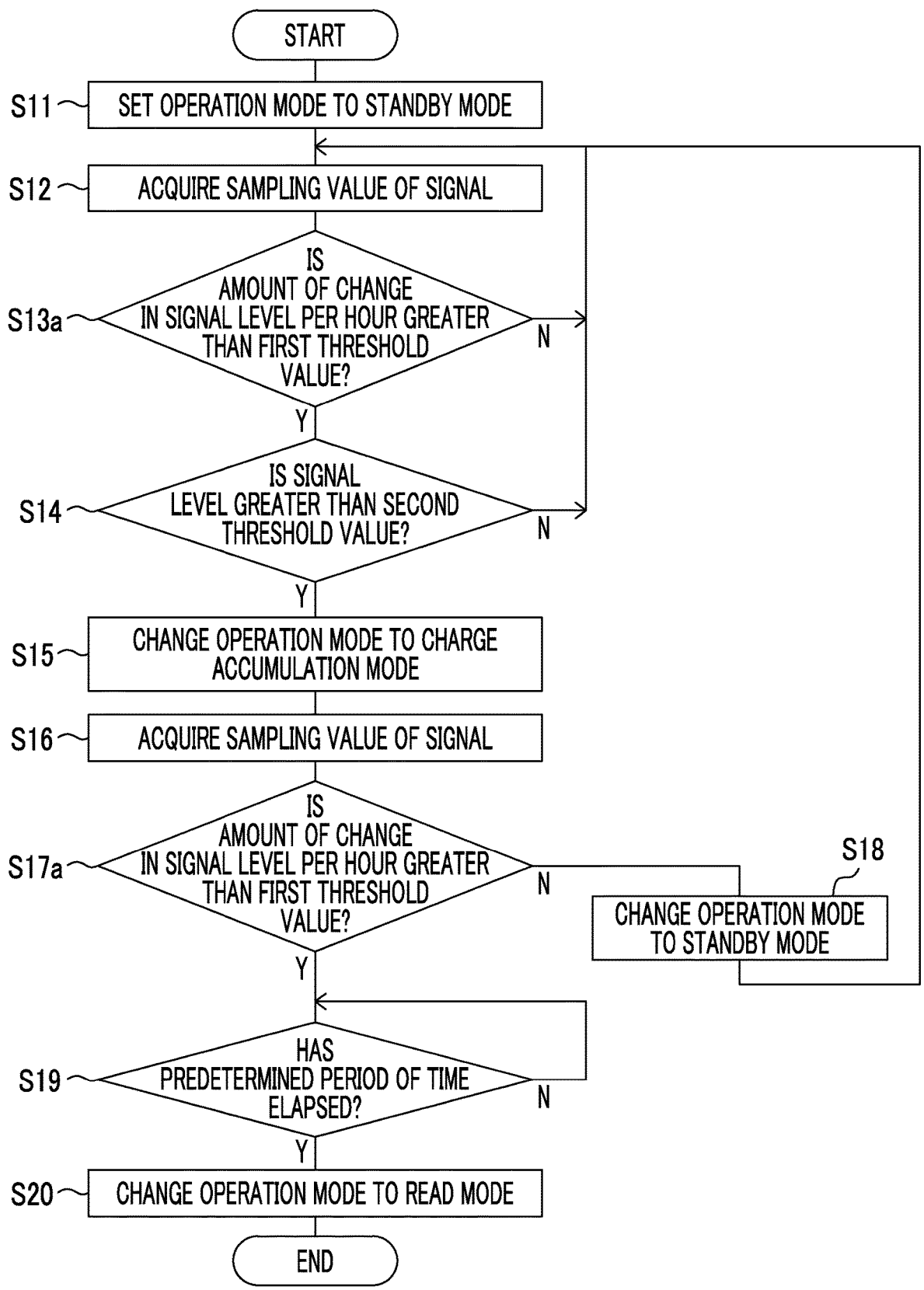
FIG. 10 is a flowchart illustrating an example of the flow of the mode change control process performed in the cassette controller according to the embodiment of the disclosed technology.

FIG. 10 is a flowchart illustrating another example of the flow of the mode change control process performed in the cassette controller 70. In this example, in Steps S13a and S17a, the CPU 701 derives the amount of change in the electric signal per hour on the basis of a plurality of sampling values and determines whether the derived amount of change is greater than the first threshold value.

According to the radiography apparatus 1 of the second embodiment of the disclosed technology, similarly to the first embodiment, resistance to vibration noise in the radiation emission determination can be higher than that in a case in which the radiation emission determination is performed on the basis of only the level of the electric signal.

In addition, according to the radiography apparatus 1 of the second embodiment, even after the operation mode of the gate line driving unit 30 is changed to the accumulation mode, the radiation emission determination based on the slope of the electric signal is performed. Therefore, the risk that the first determination will be erroneous determination is allowed, which makes it possible to set the second threshold value used to determine the level of the electric signal in the Step S14 to a relatively small value. Therefore, it is possible to reduce a time lag from the start of the emission of radiation to a change to the accumulation mode. In addition, in a case in which it is determined that radiation has not been emitted in second determination, the operation mode of the gate line driving unit 30 is changed to the read mode. Therefore, even in a case in which the first determination is erroneous determination, it is possible to rapidly reset the imaging pixel 20A and to prepare for the emission of radiation.

In the first and second embodiments, the case in which some of the pixels 20 provided on the TFT substrate 10 are used as the radiation detection pixels 20B has been described. However, the disclosed technology is not limited to this aspect.

For example, the radiation detection pixels 20B may be stacked as a separate layer different from a layer of the imaging pixels 20A. In this case, since a defective pixel is not formed, the quality of a radiographic image can be higher than that in the above-described embodiments.

Figure 11A:
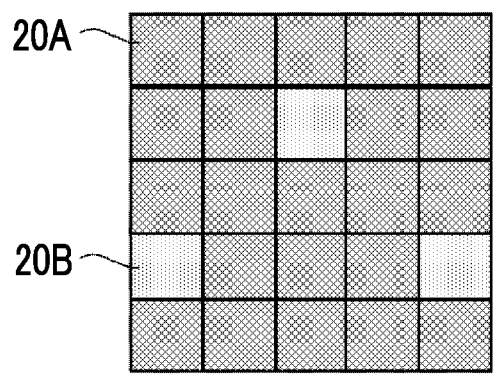
FIG. 11A is a plan view illustrating an example of the arrangement of the radiation detection pixels according to the embodiment of the disclosed technology.
Figure 11B:
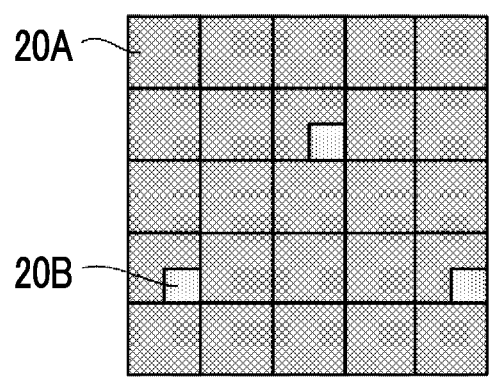
FIG. 11B is a plan view illustrating an example of the arrangement of the radiation detection pixels according to the embodiment of the disclosed technology.

In addition, in the first and second embodiments, for example, the case in which some of the imaging pixels 20A are used as the radiation detection pixels 20B as illustrated in FIG. 11A has been described. However, the disclosed technology is not limited to this aspect. For example, as illustrated in FIG. 11B, the radiation detection pixel 20B may be provided in a gap between the imaging pixels 20A.

Further, the photoelectric conversion element for detecting radiation may not be incorporated into the pixel 20 of the radiation detector 3 and may be provided separately from the radiation detector 3. However, in a case in which both the photoelectric conversion element for detecting radiation and the imaging pixel 20A are arranged on the TFT substrate 10, it is possible to reduce the size, weight, and cost of the radiography apparatus 1.

In the first and second embodiments, the case in which some of the pixels 20 provided on the TFT substrate 10 are used as the radiation detection pixels 20B and the radiation detection pixels 20B and the imaging pixels 20A are processed by the common signal lines 12 and the common signal processing unit 40 has been described. However, the disclosed technology is not limited thereto. Aspects according to the following (Example 1) to (Example 4) may be applied.

Example 1

A signal line for the radiation detection pixel 20B may be provided separately from a signal line for the imaging pixel 20A and the sampling process for the radiation detection pixel 20B may be performed by a signal processing unit different from a signal processing unit for the imaging pixel 20A. In this case, a circuit size of the signal processing unit connected to the radiation detection pixel 20B may be less than a circuit size of the signal processing unit connected to the imaging pixel 20A to reduce the consumption of power for detecting the emission of radiation. This configuration is disclosed in, for example, JP2011-174908A.

Example 2

In the radiation detection pixel 20B, the source and the drain of the thin film transistor 22 may not be short-circuited and the thin film transistor 22 may be driven by a gate line different from a gate line connected to the imaging pixel 20A. In this way, the radiation detection pixel 20B may be driven at any time independently of the imaging pixel 20A. This configuration is disclosed in, for example, JP2013-115774A.

Example 3

For the radiation detection pixel 20B, a gate line and a signal line different from a gate line and a signal line for the imaging pixel 20A may be used. In addition, the sampling process for the radiation detection pixel 20B may be performed by a signal processing unit different from a signal processing unit for the imaging pixel 20A. In this case, a circuit size of the signal processing unit connected to the radiation detection pixel 20B may be less than a circuit size of the signal processing unit connected to the imaging pixel 20A to reduce the consumption of power for detecting the emission of radiation or the radiation detection pixel 20B may be driven at any time independently of the imaging pixel 20A. This configuration is disclosed in, for example, in JP2015-222938A. Further, in this case, the radiation detection pixel 20B may be provided in a gap between the imaging pixels 20A as illustrated in FIG. 11B.

Example 4

The radiation emission determination may be performed on the basis of a change in the amount of current flowing through a bias line connected to the photoelectric conversion element 21, a change in bias voltage, a change in current or voltage through the gate line driving unit 30, or a change in the reference potential or power supply voltage of the charge amplifier forming the signal processing unit 40. This configuration is disclosed in, for example, JP2009-219538A.

In the first and second embodiments, the indirect-conversion-type radiation detector 3 which converts radiation into light with the scintillator 4 and converts the light into charge has been given as an example. However, the disclosed technology may be applied to a direct-conversion-type radiation detector which directly converts radiation into charge.

Further, the imaging pixel 20A is an example of an imaging pixel according to the disclosed technology. The radiation detection pixel 20B is an example of a detection unit according to the disclosed technology. The gate line driving unit 30 is an example of an accumulation controller according to the disclosed technology. The cassette controller 70 is an example of a mode change controller according to the disclosed technology. The signal processing unit 40 is an example of a generation unit according to the disclosed technology. The TFT substrate 10 is an example of a resin substrate according to the disclosed technology. The support member 5 is an example of a support member according to the disclosed technology. The scintillator 4 is an example of a scintillator according to the disclosed technology.

What is claimed is:

1. A radiography apparatus comprising:
   a resin substrate having flexibility;
   a plurality of imaging pixels that are provided on the resin substrate, are used to capture a radiographic image, and generate charge corresponding to an amount of incident radiation;
   a radiation detector that detects radiation and generates charge corresponding to the amount of incident radiation; and a processor configured to;
  perform control such that the charge generated in each of the imaging pixels is accumulated in the imaging pixel in a case in which an operation mode is an accumulation mode; and
  perform control such that the operation mode is changed to the accumulation mode in a case in which a rate of change in levels of electric signals based on the charge generated in the radiation detector per hour or an amount of change in the levels of the electric signals per hour is greater than a first threshold value, and at least one of the levels of the electric signals is greater than a second threshold value.

2. The radiography apparatus according to claim 1, wherein
  the processor is further configured to;
    in a case in which the operation mode is a standby mode, perform control such that the charge generated in each of the imaging pixels is removed from the imaging pixel; and
    control such that the operation mode is changed to the standby mode in a case in which the rate of change in the levels of the electric signals per hour or the amount of change in the levels of the electric signals per hour is less than the first threshold value after the operation mode is changed to the accumulation mode.

3. The radiography apparatus according to claim 1, wherein the processor is further configured to perform control such that the operation mode is maintained in the accumulation mode in a case in which the rate of change in the levels of the electric signals per hour or the amount of change in the levels of the electric signals per hour is greater than the first threshold value after the operation mode is changed to the accumulation mode.

4. The radiography apparatus according to claim 1, wherein, the processor is further configured to, in a case in which the operation mode is a read mode, perform control such that the charge accumulated in each of the imaging pixels is read, and generate image data on the basis of the charge read from each of the imaging pixels in the read mode.

5. The radiography apparatus according to claim 1, further comprising:
  a scintillator that is stacked on the resin substrate; and
  a support member that is stacked on the resin substrate and supports the resin substrate,
  wherein a natural frequency of a structure including the resin substrate, the scintillator, and the support member is equal to or less than 1 kilohertz.

6. The radiography apparatus according to claim 5, wherein the radiation detector is provided on the resin substrate.

7. The radiography apparatus according to claim 5, wherein the resin substrate includes a polyimide film.

8. The radiography apparatus according to claim 5, wherein the support member includes plastic or rubber.

9. A non-transitory computer-readable storage medium storing a program for causing a computer to function as the processor to change the operation mode of the radiography apparatus according to claim 1.

* * * * *